Nov. 13, 1923.　　　J. J. CRAPPER　　　1,474,241
TROLLEY SHEAVE
Filed March 29, 1923
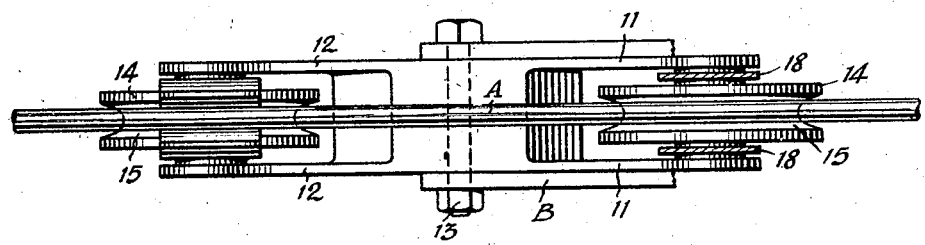
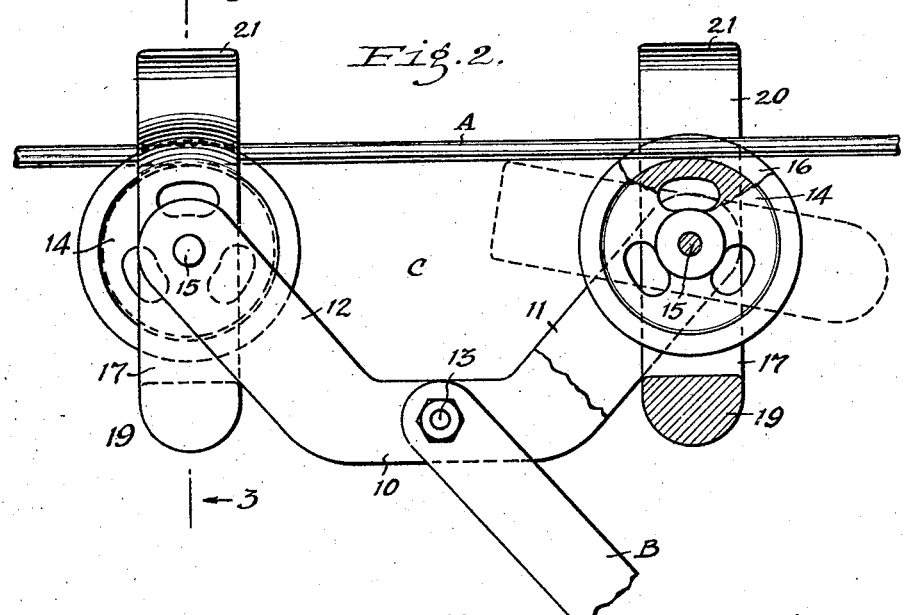
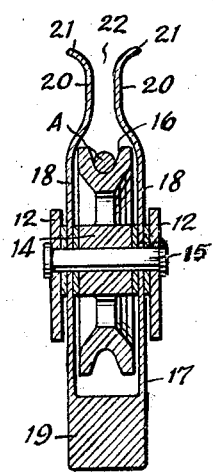
WITNESSES
INVENTOR
JOHN J. CRAPPER
BY
ATTORNEYS Patented Nov. 13, 1923.

1,474,241

UNITED STATES PATENT OFFICE.

JOHN JOSEPH CRAPPER, OF BROOKLYN, NEW YORK.

TROLLEY SHEAVE.

Application filed March 29, 1923. Serial No. 628,602.

*To all whom it may concern:*

Be it known that I, JOHN J. CRAPPER, a citizen of the United States, and a resident of the city of New York, borough of Brooklyn, in the county of Kings and State of New York, have invented a new and Improved Trolley Sheave, of which the following is a full, clear, and exact description.

This invention has relation to electric railway trolleys and has particular reference to an improvement in the trolley wire contact element which is carried by the upper end of the trolley pole for the purpose of supplying current from the trolley wire to the driving motors of the car.

At the present time a sheave or grooved wheel is mounted in the forked upper end of a trolley pole to constitute the contact element, but considerable difficulty is experienced in maintaining the sheave on the wire when the car attains a maximum speed.

It is therefore the principal object of the present invention to provide a trolley contact device which will efficiently operate to maintain itself in engagement with the trolley wire under all conditions, thus preventing the annoyance and trouble incident to its disengagement from the wire.

As a further object the invention contemplates a trolley wire contact device which will allow for its passage over a suspension means, and at cross-overs.

As a still further object the invention contemplates a trolley wire contact device which is provided with guard means for preventing the displacement of the same and which guard means also functions to facilitate the engagement of the device with the trolley wire.

As a further object the invention aims to provide a trolley wire contact device which is extremely simple in its construction, highly efficient and thoroughly reliable in its operation and inexpensive to manufacture.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a plan view of a trolley sheave constructed in accordance with the invention and illustrating the same in contact with a trolley wire.

Fig. 2 is a side view thereof with parts in section.

Fig. 3 is a transverse sectional view therethrough taken approximately on the line 3—3 of Fig. 2.

Referring to the drawing by characters of reference, A designates a trolley wire, B a trolley pole and C the improved form of sheave in its entirety. The sheave or trolley wire contact element C consists of a member 10 formed at its opposite ends with forwardly and rearwardly projecting spaced pairs of arms 11—11 and 12—12 which are preferably disposed at an upward inclination. The member 10 is fulcrumed or pivoted as at 13 for longitudinal rocking movements. Within each pair of arms 11 and 12 a sheave or trolley roller 14 is journaled on a transverse shaft, the grooved peripheries 16 of said sheaves being adapted to simultaneously embrace and engage the trolley wire A under the influence of the spring actuated trolley pole B. A guard element 17 is provided for each sheave which consists of spaced parallel side arms 18 connected at their lower ends by a weight 19. The side arms are journaled coincident with the sheaves on the transverse shafts 15, the lower ends thereof extending below the lower periphery of the sheaves and the upper ends extending normally above the upper periphery of the sheaves and the trolley wire A. The upper ends are bent inwardly toward each other as at 20, the inner faces of said inwardly bent portions being substantially of a width slightly greater than the diameter of the trolley wire. The extreme upper ends of the guard arms are bent laterally outward as at 21 to provide a flared entering mouth 22 for facilitating the position of the contact device on the trolley wire. The weights 19 serve to normally maintain the guard elements in a vertical position whereby accidental displacement of the sheaves is reduced to a minimum. When the contact element encounters a supporting wire or cross-over or any other obstruction in its path of movement, the guard elements 17 are free to be swung to an angular position to clear said obstructions as illustrated in dotted lines in Fig. 2. It will also be noted that by providing the contact element with two sheaves and points of contact, in passing over cut-out or cross-overs of lesser length than the distance between the two sheaves the flow of current will not be interrupted to affect the lighting system of the car or the power to the motors.

I claim:

1. A trolley comprising a member having pivotal connection with the upper end of a trolley pole for longitudinal rocking movement, longitudinally spaced contact sheaves journaled to said member for making contact with the trolley wire at longitudinally spaced points, and guard means for each contact element for maintaining the same in contact with the trolley wire, said guard means consisting of spaced pairs of arms, a weight connecting the lower end of each pair of arms, said arms being journaled coincident to the sheaves and having their upper extremities projecting beyond the upper periphery of the sheaves, said upwardly projecting ends having inwardly bent portions and outwardly flared terminals.

2. An overhead trolley contact element comprising a member having pivotal connection with the upper end of a trolley pole for longitudinal rocking movements, longitudinally spaced bifurcated bearing arms provided on said member, a contact sheave journaled in each bearing arm, a forked guard element journaled on each arm coincident with the sheave, and a weight at the lower end of each guard element for normally maintaining the upper ends in embracing relation to the trolley wire, said upper ends being spaced apart a distance slightly greater than the diameter of the trolley wire and having out-turned extremities providing a flared entering mouth.

JOHN JOSEPH CRAPPER.